US008774049B2

(12) United States Patent
Rune et al.

(10) Patent No.: US 8,774,049 B2
(45) Date of Patent: Jul. 8, 2014

(54) METHOD AND APPARATUS FOR USE IN A COMMUNICATIONS NETWORK

(75) Inventors: Johan Rune, Lidingö (SE); Conny Larsson, Täby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 311 days.

(21) Appl. No.: 12/739,826

(22) PCT Filed: Oct. 26, 2007

(86) PCT No.: PCT/EP2007/061575
§ 371 (c)(1),
(2), (4) Date: Apr. 28, 2010

(87) PCT Pub. No.: WO2009/052871
PCT Pub. Date: Apr. 30, 2009

(65) Prior Publication Data
US 2010/0226283 A1    Sep. 9, 2010

(51) Int. Cl.
*H04L 12/28* (2006.01)
(52) U.S. Cl.
USPC .......................................................... 370/254
(58) Field of Classification Search
None
See application file for complete search history.

(56) References Cited

U.S. PATENT DOCUMENTS

| 6,564,342 | B2 * | 5/2003 | Landan | 714/48 |
| 6,892,069 | B1 * | 5/2005 | Flynn | 455/432.1 |
| 7,150,024 | B2 * | 12/2006 | Atkinson et al. | 719/316 |
| 7,284,068 | B1 | 10/2007 | Ramalho | |
| 7,840,217 | B2 * | 11/2010 | Patel et al. | 455/439 |
| 2008/0126492 | A1 * | 5/2008 | Guidi et al. | 709/206 |
| 2010/0241737 | A1 * | 9/2010 | Hirano et al. | 709/220 |
| 2010/0296481 | A1 * | 11/2010 | Weniger et al. | 370/331 |
| 2011/0286384 | A1 * | 11/2011 | Sugimoto et al. | 370/328 |

OTHER PUBLICATIONS

Registration Revocation in Mobile IPv4, RFC 3543, Internet Society, Aug. 2003. Internet Control Message Protocol, RFC 792, Internet Society, Sep. 1981. Internet Control Message Protocol, ICMPv6 for the Internet Protocol Version 6 (IPv6) Specification, RFC 4443, Internet Society, Mar. 2006.*

S Gundavelli, K. Leung, V. Devarapalli, K. Chowdhury and B. Patil, Proxy Mobile IPv6, draft-ietf-netlmm-proxymip6-00.txt, Internet Society, Apr. 8, 2007. Maarten Bodlaender, Jarno Guidi, Lex Heerink, "Enhancing Discovery with Liveness", Consumer Communications and Networking Conference, CCNC 2004, First IEEE, pp. 636-638, Jan. 5-8, 2004.*

Leung G Dommety P Yegani Cisco Systems K Chowdhury Starent Networks K: "WiMAX Forum/3GPP2 Proxy Mobile IPv4; draft-leung-mip4-proxy-mode-03.txt" IETF Standard-Working-Draft, Internet Engineering Task Force, IETF, CH, No. 3, Jul. 3, 2007, XP015051928.

(Continued)

*Primary Examiner* — Dang Ton
*Assistant Examiner* — Ronald h Davis

(57) ABSTRACT

A method and apparatus for use in a communications network in which a Mobile Node accesses the communications network via a proxy node. The proxy node is arranged to handle mobility signalling on behalf of the Mobile Node. At a mobility anchor function, such as a Local Mobility Anchor, a first Care-of-Address associated with the Mobile Node is registered. When the mobility anchor function receives a registration request to register a second Care-of-Address associated with the Mobile Node, it sends a request message to the proxy node acting on behalf of the Mobile Node. The request message instructs the proxy node to check whether the Mobile Node is reachable using the first Care-of-Address.

9 Claims, 3 Drawing Sheets

(56) References Cited

OTHER PUBLICATIONS

Anand Bedekar Ajoy Singh Vinod Kumar Suresh Kalyanasundaram Motorola: "A Protocol for Network-based Localized Mobility Management; draft-singh-netlmm-protocol-02.txt" IETF Standard-Working-Draft, Internet Engineering Task Force, IETF, CH; No. 2; Mar. 5, 2007, XP015050426.

* cited by examiner

1

METHOD AND APPARATUS FOR USE IN A COMMUNICATIONS NETWORK

TECHNICAL FIELD

The present invention relates to communications networks, and in particular to a method for use in a Proxy Mobile IP communications network.

BACKGROUND

Mobile IPv6 (MIPv6), which is described in IETF RFC 3775, allows users of mobile communications devices to move from one network to another whilst maintaining a permanent IP address, regardless of which network they are in. This allows the user to maintain connections whilst on the move. For example, if a user were participating in a Voice Over IP (VoIP) session and, during the session the user moved from one network to another, without MIPv6 support the user's IP address may change. This would lead to problems with the VoIP session.

A Mobile Node (MN) is allocated two IP addresses: a permanent home address and a care-of address (CoA). The CoA is associated with an access network, an IP subnet, that the user is currently visiting. To communicate with the MN, packets are sent to the MN home address. These packets are intercepted by a Home Agent (HA) in the home network, which has knowledge of the current CoA. The Home Agent then tunnels the packets to the CoA of the MN with a new IP header, whilst preserving the original IP header. When the packets are received by the MN, it removes the new IP header and obtains the original IP header. The MN sends packets to another node by tunnelling them to the HA, encapsulated in packets addressed to the HA. For each packet, the HA removes the encapsulating packet, restores the original packet and forwards it to the intended destination node.

Proxy Mobile IPv6 (PMIPv6), IETF draft-sgundave-mip6-proxymip6-02, describes a Mobile Access Gateway (MAG) function. This function emulates home link properties in order to make a MN behave as though it is on its home network and allows support for mobility on networks that would not otherwise support MIPv6. A key difference between PMIPv6 and MIPv6 is that using MIPv6, a MN has control of its own mobility signalling, whereas using PMIPv6, a MN does not have control of its mobility signalling. The basic components of a PMIPv6 architecture are illustrated in FIG. 1.

A MAG 101 is usually implemented at the access router. The MAG 101 sends and receives mobility related signalling on behalf of a MN 102. When a MN 102 connects to an access router having a MAG 101, the MN 102 presents its identity in the form of a Network Access Identifier (NAI) as part of an access authentication procedure. Once the MN 102 has been authenticated, the MAG obtains the user's profile from a policy store. The MAG 101, having knowledge of the user profile and the NAI, can now emulate the MN's home network. The MN 102 subsequently obtains its home address from the MAG. The MAG 101 also informs the MN's 102 Local Mobility Anchor (LMA) 103 of the current location of the MN 102 using a Proxy Binding Update message. The Proxy Binding Update message uses the NAI of the MN 102. Upon receipt of the Proxy Binding Update message, the LMA 103 sets up a tunnel to the MAG 101 and sends a Proxy Binding Acknowledgement to the MAG. On receipt of the Proxy Binding Acknowledgement, the MAG 101 sets up a tunnel to the LMA, effectively forming a bidirectional tunnel. All traffic to and from the MN 102 is routed through the LMA 103 via the bidirectional tunnel. A MAG may serve many MNs associated with the same LMA. The MAG and the LMA do not need to have a dedicated bidirectional tunnel for each MN. Instead the same bidirectional tunnel can be used for the traffic of all the MNs that are associated with the same LMA and that are currently being served by the same MAG.

The LMA 103 intercepts any packet that is sent to the MN 102, and forwards the intercepted packet to the MAG 101 through the tunnel. On receipt of the packet, the MAG 101 removes the tunnel header and sends the packet to the MN 102. The MAG 101 acts as a default router on the access link. Any packets sent from the MN are sent via the MAG 101 through the tunnel to the LMA 103, which then sends the packet on to its ultimate destination.

Simultaneous Multi-Access describes a function of a communications network that allows a MN to combine different radio and/or fixed access technologies, as illustrated in FIG. 2. The MN 102 can simultaneously use several interfaces and different access networks (AN1 and AN2), which may employ different access technologies, in a communications session. Different traffic flows, belonging to different applications can be transferred between different access networks, independently of each other.

MIPv6 can be extended to support Simultaneous Multi-Access (see R. Wakikawa et al., "Multiple Care-of Addresses Registration", Internet-Draft draft-ietf-monami6-multiple-coa-02, March 2007). Where more than one access is used, a MN has a CoA for each access. A Binding Unique Identifier (BID) is associated with each CoA, and the BID indicates which CoA a Binding Update (BU) relates to. If the BID associated with a new CoA is already in use, the new CoA replaces the one previously associated with the BID, whereas if the BID is not already in use, the new CoA is added to any previously existing CoAs. Since MIPv6 is host-centric (that is to say, the MN is in control of its mobility signalling), with all the mobility signalling flowing between the MN and the HA, the MN has a complete overview and complete control of how CoAs are added to or replacing each other, by assigning the BIDs appropriately.

Using PMIPv6, the MN is not in control of its mobility signalling. As described above, mobility signalling is handled by a MAG on behalf of the MN. A Proxy Binding Update (PBU) is triggered when the MN attaches to an access and the MAG responsible for the access. This means that a MN has no way of indicating its intentions regarding how the accesses are to be used in terms of PMIPv6, i.e. whether a new access should be added to the already used accesses or replace one or more old one(s).

In the absence of explicit intention indications from the MN, the PMIPv6 LMA can operate in either of two modes:

1. Simultaneous Multi-Access mode, where new CoAs are added to old ones and an old CoA is deregistered only when the MN detaches (explicitly or implicitly by losing contact) from the corresponding access.

2. Non-simultaneous multi-access mode, where only a single CoA is used at a time and a new CoA consequently replaces the previous one.

Although the description of the Simultaneous Multi-Access mode above clearly states that a new CoA should always be added to the existing ones and never replaces an old one, a problem can arise when a MN attaches to a new access and the MAG of that access registers a new CoA in the LMA. In accordance with the simultaneous multi-access mode the LMA will not deregister the old CoA(s). However, the reason for attaching to the new access might well have been that the MN lost an old (and possibly only) access. If this is the case, the MN has not explicitly signalled to the old access that it has detached (even if such means were available in the old access network) and the MAG of the old access has to rely on some kind of time-out or periodic check mechanism, e.g. neighbour unreachability detection (NUD), to detect the detachment before it deregisters the CoA in the LMA. Before the detachment is detected and the old CoA deregistered, the LMA may continue to send traffic to the old MAG, and so packets in that traffic are lost when forwarded to the no longer attached MN. It would be desirable to prevent this packet loss.

SUMMARY

When a LMA (operating in simultaneous multi-access mode) receives a registration of a new CoA, it sends a message to the MAG of each of the old accesses (for which CoAs are still registered) and asks the respective MAG to immediately explicitly check whether the MN is still reachable through the access. Each MAG carries out the requested check, preferably using an ICMPv6 Echo Request message, and deregisters the CoA in the LMA if the MN is not reachable.

According to a first aspect of the invention, there is provided a method for use in a communications network in which a Mobile Node accesses the communications network via a proxy node. The proxy node is arranged to handle mobility signalling on behalf of the Mobile Node. At a mobility anchor function, which is typically a Local Mobility Anchor, a first Care-of-Address associated with the Mobile Node is registered. When the mobility anchor function receives a registration request to register a second Care-of-Address associated with the Mobile Node, it sends a request message to the proxy node acting on behalf of the Mobile Node. The request message instructs the proxy node to check whether the Mobile Node is reachable using the first Care-of-Address. In this way, the mobility anchor function can be informed as to whether the Care-of-Address is still in use by the Mobile Node.

The communications network is optionally selected from one of a Proxy Mobile IPv4 network and a Proxy Mobile IPv6 network, the mobility anchor function is a Local Mobility Anchor function, and the proxy node is a Mobile Access Gateway.

Optionally, the method further comprises receiving a response message from the proxy node, the response message being triggered by the request message. The response message can be used to inform the mobility anchor function whether or not the Care-of-Address is still in use by the Mobile Node. Alternatively, if no response is received from the proxy node, then the mobility anchor function takes no further action, and the first Care-of-Address remains registered at the mobility anchor function.

Optionally, the response message requests the mobility anchor function to deregister the first Care-of-Address. The response message optionally includes information informing the Local Mobility Anchor function that the Mobile Node can not be reached using the first Care-of-Address, in which case the mobility anchor function can take action to deregister the first Care-of-Address. This allows the mobility anchor function to positively know that the Mobile Node is no longer reachable using the first Care-of-Address. In a further alternative, the response message includes information informing the mobility anchor function that the Mobile Node can be reached using the first Care-of-Address, in which case the mobility anchor function need take no further action. Again, this allows the mobility anchor function to positively know that the Mobile Node is reachable using the first Care-of-Address.

The method optionally comprises sending the request message to a plurality of proxy nodes, each proxy node associated with a Care-of-Address, each Care-of-Address associated with the Mobile Node. This is a typical situation of a mobility anchor function such as a Local Mobility Anchor serving several proxy nodes, or MAGs, and allows the mobility anchor function to maintain track of different Care-of-Addresses that may be used ny the Mobile Node operating in a Simultaneous Multi-access mode, even where different proxy nodes are serving the Mobile Node for different accesses.

The request message is optionally selected from a Proxy Mobile IPv6 message and a Proxy Mobile IPv4 Register Revocation message, the Proxy Mobile IPv4 Register Revocation message comprising a flag indicating that revocation of the Care-of-Address is conditional upon the Mobile Node being unreachable.

The proxy node, after receiving the request message from the mobility anchor function, optionally determines the reachability status of the Mobile Node. An example of a way to determine the reachability status of the Mobile Node is to send query message to the Mobile Node. The query message is optionally selected from one of an Internet Control Message Protocol for IPv4 Echo Request message, an Internet Control Message Protocol for IPv6 Echo Request message, a Neighbour Solicitation message and an Address Resolution Protocol message. By determining the reachability of the Mobile Node using the Care-of-Address, the proxy node can inform the mobility anchor function of the reachability of the Mobile Node. As described above, the proxy node can positively inform the mobility anchor function of the reachability of the Mobile Node, or can make no response, in which case the mobility anchor function assumes that the Mobile Node is reachable using the first Care-of-Address.

The method optionally further comprises, after receiving the registration request to register a second Care-of-Address associated with the Mobile Node, caching copies of all incoming packets directed to the first Care-of-Address. In the event that the Mobile Node is unreachable using the first Care-of-Address, the cached packets are sent to the second Care-of-Address. The cache is then cleared and further caching is stopped for all incoming packets directed to the first Care-of-Address. In this way, packet loss in the event that a Mobile Node is unreachable using the first Care-of-Address is minimized.

Optionally, the method comprises, after receiving the registration request to register a second Care-of-Address associated with the Mobile Node, caching copies of all incoming packets directed to the first Care-of-Address. In the event that the mobility anchor function receives a message from the proxy node indicating that the Mobile Node is reachable using the first Care-of-Address, the cache is cleared and no further copies of incoming packets directed to the first Care-of-Address are cached. This prevents unnecessary caching of packets once it has been determined that the Mobile Node is reachable using the first Care-of-Address.

According to a second aspect of the invention, there is provided a mobility anchor node for use in a communications network in which a Mobile Node accesses the communications network via a proxy node. The mobility anchor node comprises means for registering a first Care-of-Address associated with a Mobile Node, a receiver for receiving a registration request to register a second Care-of-Address associated with the Mobile Node, and a transmitter for transmitting a request message to the proxy node, the request message instructing the proxy node to determine whether the Mobile Node is reachable using the first Care-of-Address.

The mobility anchor node optionally comprises means for receiving a response message from the proxy node, the response message being sent in response to the request message, and means for de-registering the first Care-of-Address at the mobility anchor function.

The transmitter is optionally arranged to transmit the request message to a plurality of proxy nodes, each proxy node associated with a Care-of-Address, each Care-of-Address associated with the Mobile Node. This is because a mobility anchor node typically serves several proxy nodes.

To avoid unnecessary packet loss, the mobility anchor node optionally comprises means for caching copies of all incoming packets directed to the first Care-of-Address, and means for, in the event that the Mobile Node is unreachable using the first Care-of-Address, sending the cached packets to the second Care-of-Address and clearing the cache.

According to a third aspect of the invention, there is provided a proxy node for use in a communications network in which a Mobile Node accesses the communications network via a proxy node. The proxy node comprises a receiver for receiving a request message sent from a mobility anchor node, the request message related to the reachability of a Mobile Node attached to the proxy node using a Care-of-Address. The proxy node further comprises a transmitter for sending a query to the Mobile Node, and means for determining whether the Mobile Node is reachable using the Care-of-Address. Means for sending a message to the mobility anchor node are provided, the message comprising information selected from information informing the mobility anchor node that the Mobile Node is unreachable using the first Care-of-Address, and information requesting the mobility anchor function to deregister the first Care-of-Address.

DETAILED DESCRIPTION

The following description sets forth specific details, such as particular embodiments, procedures, techniques, etc. for purposes of explanation and not limitation. It will be appreciated by one skilled in the art that other embodiments may be employed apart from these specific details. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
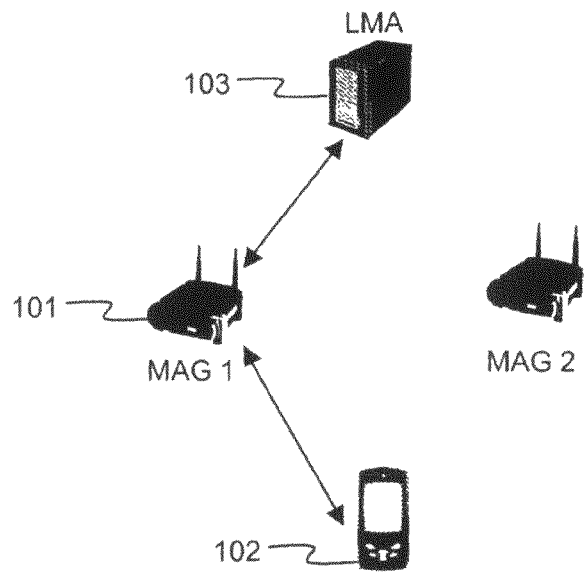
FIG. 1 illustrates schematically in a block diagram a Proxy Mobile IPv6 architecture.
Figure 2:
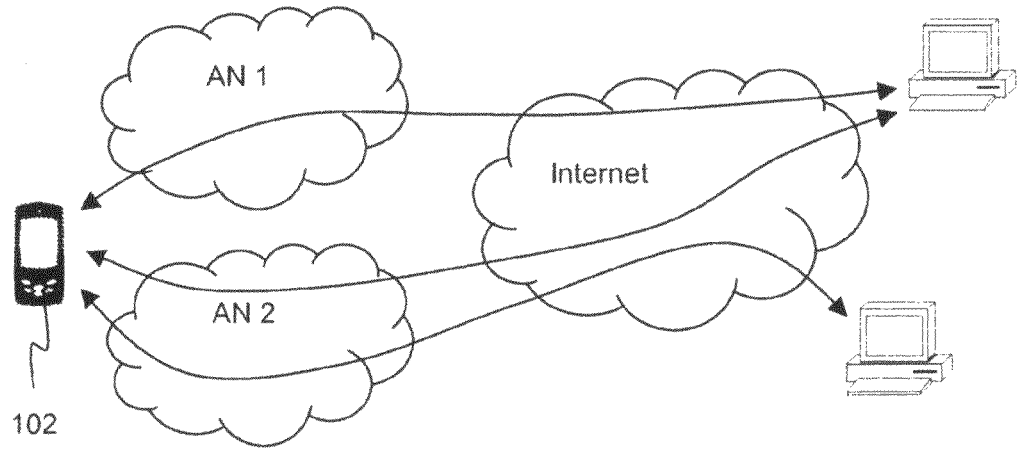
FIG. 2 illustrates schematically in a block diagram a Simultaneous Multi-Access architecture.
Figure 3:
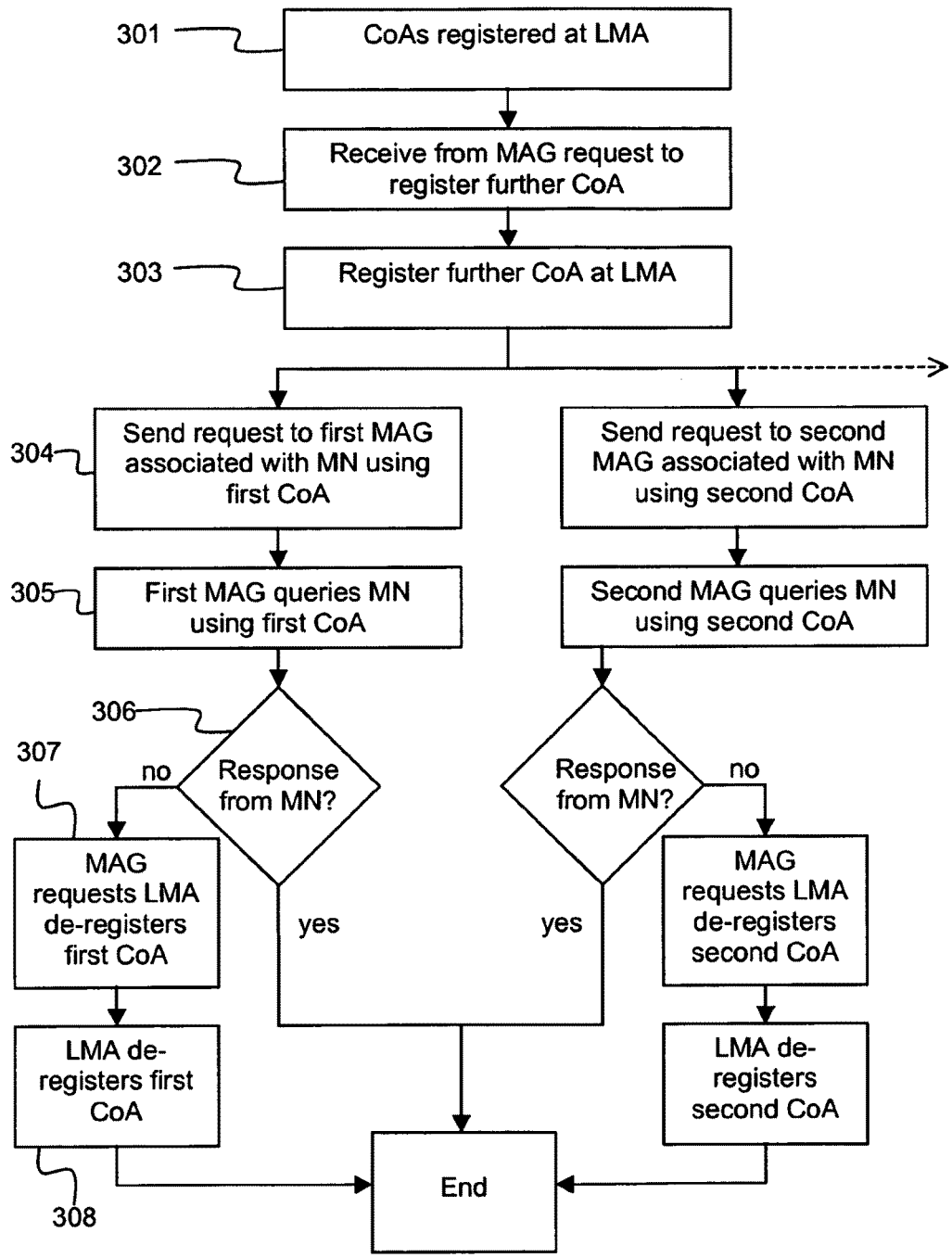
FIG. 3 is a flow diagram illustrating the steps of an embodiment of the invention.

FIG. 3 herein illustrates the method of an embodiment of the invention. Using the numbering of FIG. 3, the steps are as follows:

301. When a Mobile Node (MN) attached to a PMIPv6 supporting network is operating in a Simultaneous Multi-Access mode, it will have several Care-of-Addresses (CoA) registered with a Local Mobility Anchor. Each CoA may be used to reach the MN via a Mobile Access Gateway (MAG).

302. When the MN performs a further network attachment to another MAG, the MAG sends a request to the LMA to register a further CoA to be used for the further session.

303. The further CoA is registered at the LMA. However, in case one of the already registered CoAs is no longer valid, it is desirable to check whether the MN has simply added a new access to a set of simultaneous accesses or has attached to the new access in order to replace an old one that it has lost or for some other reason is no longer using.

304. The LMA sends a reachability check request message (typically a PMIPv6 message is used, but if the network is a PMIPv4 network, the reachability check request is sent in a PMIPv4 message, e.g. indicated by a new flag in an existing PMIPv4 Register Revocation message, thereby making the revocation conditional (i.e. executed only if the terminal is unreachable) to each MAG that is associated with a registered CoA other than the latest CoA registered in the previous step. The reachability check request message instructs the MAG to immediately explicitly check whether the MN is still reachable. Note that in FIG. 3, a check for reachability using two CoAs from two associated MAGs is shown, but as illustrated by the dashed arrow, this check is performed by every MAG that has a registered CoA associated with it (other than the latest CoA registered in the previous step).

305. Each MAG checks the MN's reachability on the CoA that the MAG has registered in the LMA on behalf of the MN. The check may or may not be access specific. Typically the MAG sends a query message to the MN. The query message may be access specific. In many accesses a neighbour solicitation message (or ARP request in IPv4 networks) is used, or alternatively an ICMPv6 (or ICMPv4) Echo Request message is used.

306. If the MN is still reachable on the concerned CoA, e.g. if the MAG receives a response from the MN using a specific CoA then no further action is taken.

307. If, on the other hand, the MAG determines that the MN is no longer reachable, e.g. because it receives no response from the MN, then it requests the LMA to deregister the relevant CoA.

308. The LMA then deregisters each CoA on which the MN has been determined unreachable, e.g. for which no response from the MN has been received. In this way, a CoA is not maintained as registered if connectivity has been lost or the MN is no longer using that CoA for any reason.

It will be appreciated that specific steps of the method may vary. For example, the flow diagram shows no further action being taken if a MAG determines that a MN is reachable, e.g. if it receives a response from the MN. However, the MAG may report this positive result to the LMA to ensure that the LMA is aware that the CoA is still in use and should maintain its registered state. This alternative procedure would serve the purpose of making the protocol more robust.

Figure 4:
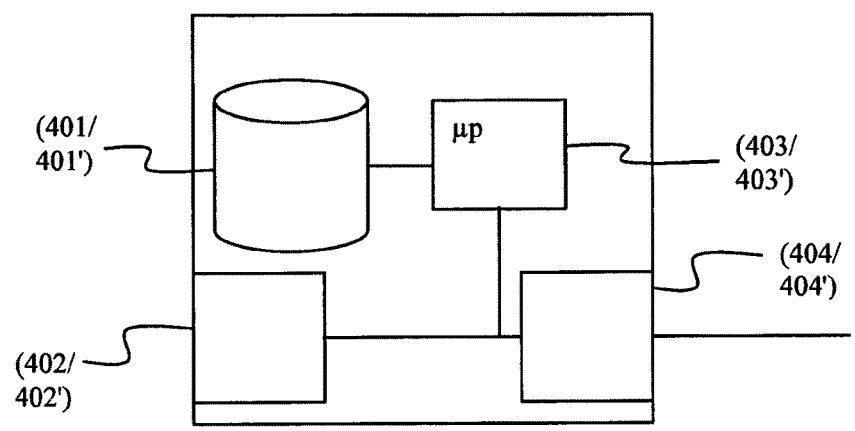
FIG. 4 illustrates schematically in a block diagram a node for use according to embodiments of the invention.

Referring to FIG. 4, there is illustrated a node for use in a PMIPv6 network. In the case where the node is a LMA, the LMA comprises storage means 401 for storing a registration of all CoAs associated with a MN. The LMA further comprises a receiver for receiving signalling, such as the request to register a further CoA, and the results of the reachability of the MN using different CoAs. A processor 403 is also provided for updating the storage means 401 by registering the further CoA and deregistering any registered CoAs which are no longer valid. A transmitter 404 is also provided, that is used to send messages to MAGs to instruct them to perform a reachability check.

In the case where the node illustrated in FIG. 4 is a MAG, the MAG comprises a receiver 402' for receiving a reachability check instruction message from the LMA. The MAG further comprises a processor 403' for constructing a query message, and a transmitter 404' for sending the query message to the MN. A further receiver, which may or may not be the same receiver as 402', is also used for receiving a response to the query from the MN, and a further transmitter, which may or may not be the same transmitter as 404', is also used for sending the results of the MN query to the LMA. Typically, the MAG will communicate with the LMA and the MN through different interfaces, and so it is most likely that different physical transmitters and receivers are provided.

The invention significantly reduces the time an LMA maintains a registration for a CoA that is no longer in use, thereby reducing the number of packets lost where a CoA is no longer reachable. However, some packets may still be sent towards this CoA, and thus lost, before the LMA deregisters an invalid CoA. To avoid this packet loss, according to a further embodiment the LMA caches copies of the packets sent towards a CoA with uncertain status when it sends the request to the corresponding MAG.

If it transpires that the CoA is reachable (and that its corresponding access can therefore be used), the LMA stops caching packet copies and discards the already cached packet copies. If on the other hand it transpires that a CoA with uncertain status is not reachable, then the LMA may send the cached packet copies towards the newly registered CoA (or to any other CoA that is shown to be reachable).

In the case where packets are cached, the MAG returns an explicit response to the LMA's reachability check request, even if the CoA associated with the MAG is reachable, so that the LMA knows when to stop caching packet copies. The response message may be in the form of a new PMIPv6 message or as a flag in an existing message. If the PMIPv4 (see K. Leung et al., "Mobility Management using Proxy Mobile IPv4", Internet-Draft draft-leung-mip4-proxy-mode-02, January 2007) is used, the Registration Revocation Acknowledgement message can be used for the response, e.g. by including a new flag or status code.]

The invention provides a fast way to determine whether a new CoA is being registered to replace an old CoA or whether it should simply be added to an existing set of CoAs for PMIPv6 in simultaneous multi-access mode. The risk of forwarding packets to an invalid CoA is reduced for PMIPv6 in simultaneous multi-access mode, and with the optional system of caching copies of packets in the LMA, packet losses can be avoided in the time it takes for the LMA to ascertain the status of a given CoA.

It will be appreciated by the person of skill in the art that various modifications may be made to the above described embodiments without departing from the scope of the present invention. For example, whilst the invention is described using the examples of Proxy MIP or PMIPv6, it will be appreciated that it may also be used for any protocol that supports gateways or proxy gateways.

The following acronyms have been used in this specification:

ARP Address Resolution Protocol
BID Binding Unique Identifier
BU Binding Update
CoA Care-of Address
HA Home Agent
ICMPv4 Internet Control Message Protocol for IPv4
ICMPv6 Internet Control Message Protocol for IPv6
IP Internet Protocol
IPv4 Internet Protocol version 4
IPv6 Internet Protocol version 6
LMA Local Mobility Anchor
MAG Mobile Access Gateway
MIPv6 Mobile IPv6
MN Mobile Node
NUD Neighbor Unreachability Detection
PBU Proxy Binding Update
PMIPv6 Proxy Mobile IPv6
PMIPv4 Proxy Mobile IPv4
RFC Request For Comments

The invention claimed is:

1. A method for use in a Proxy Mobile IP network in which a Mobile Node accesses the Proxy Mobile IP network via a plurality of Mobile Access Gateways, the Mobile Access Gateways arranged to handle mobility signalling on behalf of the Mobile Node, the method comprising:
   at a Local Mobility Anchor function, registering a first Care-of-Address associated with the Mobile Node;
   receiving a request to register a second Care-of-Address associated with the Mobile Node;
   registering the second Care-of-Address associated with the Mobile Node;
   sending a request message to one of the plurality of Mobile Access Gateways acting on behalf of the Mobile Node and associated with the first Care-of-Address, the request message instructing the Mobile Access Gateway associated with the first Care-of-Address to check whether the Mobile Node is reachable through the first Care-of-Address;
   receiving a response message from the Mobile Access Gateway associated with the first Care-of-Address, the response message being triggered by the request message, wherein the response message includes information informing the Local Mobility Anchor function that the Mobile Node can not be reached using the first Care-of-Address; and
   clearing a cache and stopping caching copies of incoming packets directed to the first Care-of-Address.

2. The method according to claim 1, wherein the request message is selected from a Proxy Mobile IPv6 message and a Proxy Mobile IPv4 Register Revocation message, the Proxy Mobile IPv4 Register Revocation message comprising a flag indicating that revocation of the first Care-of-Address is conditional upon the Mobile Node being unreachable.

3. The method according to claim 1, further comprising, at the Mobile Access Gateway associated with the first Care-of-Address, after receiving the request message from the Local Mobility Anchor function, determining a reachability status of the Mobile Node.

4. The method according to claim 3, wherein the determining the reachability status of the Mobile Node comprises sending a query message to the Mobile Node.

5. The method according to claim 4, wherein the query message is selected from one of an Internet Control Message Protocol for IPv4 Echo Request message, an Internet Control Message Protocol for IPv6 Echo Request message, a Neighbour Solicitation message and an Address resolution Protocol message.

6. The method according to claim 1, further comprising:
   after receiving the registration request to register a second Care-of-Address associated with the Mobile Node, at the Local Mobility Anchor function, caching copies of all incoming packets directed to the first Care-of-Address; and
   in response to the response message, sending the cached packets to the second Care-of-Address, clearing a cache and stopping caching copies of all incoming packets directed to the first Care-of-Address.

7. The method according to claim 1, further comprising:
in response to receiving the response message, deregistering the first Care-of-Address associated with the Mobile Node at the Local Mobility Anchor function.

8. A method for use in a Proxy Mobile IP network in which a Mobile Node accesses the Proxy Mobile IP network via a plurality of Mobile Access Gateways, the Mobile Access Gateways arranged to handle mobility signalling on behalf of the Mobile Node, the method comprising:
   at a Local Mobility Anchor function, registering a first Care-of-Address associated with the Mobile Node;
   receiving a request to register a second Care-of-Address associated with the Mobile Node;
   registering the second Care-of-Address associated with the Mobile Node;
   sending a request message to one of the plurality of Mobile Access Gateways acting on behalf of the Mobile Node and associated with the first Care-of-Address, the request message instructing the Mobile Access Gateway associated with the first Care-of-Address to check whether the Mobile Node is reachable through the first Care-of-Address;
   after receiving the registration request to register the second Care-of-Address associated with the Mobile Node, at the Local Mobility Anchor function, caching copies of all incoming packets directed to the first Care-of-Address;
   at the Local Mobility Anchor function, receiving a message from the Mobile Access Gateway associated with the first Care-of-Address indicating that the Mobile Node is reachable using the first Care-of-Address; and
   clearing a cache and stopping caching copies of incoming packets directed to the first Care-of-Address.

9. A Local Mobility Anchor node for use in a Proxy Mobile IP network in which a Mobile Node accesses the Proxy Mobile IP network via a plurality of Mobile Access Gateways, the Local Mobility Anchor node comprising:
   means for registering a first Care-of-Address associated with a Mobile Node;
   a receiver for receiving a registration request to register a second Care-of-Address associated with the Mobile Node;
   means for registering the second Care-of-Address;
   a transmitter for transmitting a request message to one of the plurality of Mobile Access Gateways acting on behalf of the Mobile Node and associated with the first Care-of-Address, the request message instructing the Mobile Access Gateway associated with the first Care-of-Address to determine whether the Mobile Node is reachable through the first Care-of-Address;
   means for receiving a response message from the Mobile Access Gateway associated with the first Care-of-Address, the response message being triggered by the request message;
   means for de-registering the first Care-of-Address at the Local Mobility Anchor function;
   means for caching copies of all incoming packets directed to the first Care-of-Address in a cache; and
   means for, in the event that the Mobile Node is unreachable using the first Care-of-Address, sending the cached packets to the second Care-of-Address and clearing the cache.

* * * * *